(12) United States Patent
Tien et al.

(10) Patent No.: US 7,683,576 B2
(45) Date of Patent: Mar. 23, 2010

(54) SMART LEAD ACID BATTERY CHARGING/DISCHARGING MANAGEMENT SYSTEM

(76) Inventors: Jenn-Yang Tien, 2F-1, No. 83, Sec. 2, Gongdaowu Rd., Hsinchu City (TW); Jan-Wu Hong, 2F-1, No. 83, Sec. 2, Gongdaowu Rd., Hsinchu City (TW)

( * ) Notice: Subject to any disclaimer, the term of this patent is extended or adjusted under 35 U.S.C. 154(b) by 398 days.

(21) Appl. No.: 11/742,658

(22) Filed: May 1, 2007

(65) Prior Publication Data
US 2008/0272736 A1   Nov. 6, 2008

(51) Int. Cl.
*H01M 10/46* (2006.01)

(52) U.S. Cl. .................................................. 320/128
(58) Field of Classification Search ................ 320/106, 320/112, 132, 141, 101, 116, 128, 130
See application file for complete search history.

(56) References Cited

U.S. PATENT DOCUMENTS

| | | | |
|---|---|---|---|
| 6,025,698 A * | 2/2000 | Kim et al. | 320/132 |
| 6,509,657 B1 * | 1/2003 | Wong et al. | 307/66 |

* cited by examiner

*Primary Examiner*—Edward Tso
(74) *Attorney, Agent, or Firm*—Pro-Techtor Int'l Services; Ralph Willgohs (57) ABSTRACT

A smart lead-acid battery charging/discharging management system comprised of one or a plurality of identical smart battery unit with each including a controller, a lead-acid battery, and a sensor switch device working together with a alternator and a voltage regulator to upgrade charging efficiency, achieve consistent capacity among batteries, and isolate malfunctioning or failing battery to extend service life of the battery.

20 Claims, 12 Drawing Sheets

SMART LEAD ACID BATTERY CHARGING/DISCHARGING MANAGEMENT SYSTEM

BACKGROUND OF THE INVENTION (a) Field of the Invention

The present invention is related to a smart lead-acid charging-management system, and more particularly, to one focusing on management of multiple lead-acid batteries that upgrades charging efficiency and extends service life of the lead-acid battery by an automatically created master-slave system controlled by a primary device to charge those batteries one by one by turns to maintain activated status of plate in the course of charging each battery unit under lower source demand.

(b) Description of the Prior Art

Disregarding a very remarkable achievement reported in R&D of new types of secondary battery (including Ni-MH and Lithium-Ion batteries) during nearly a decade, primary applications of those new secondary batteries remain focusing on providing compact and portable sources needed in Notebook, cellular phone, personal digital assistance (PDA), and other communication equipments; however, starting, lighting, and ignition (SLI) systems still rely upon a lead-acid battery. As oil price soars highly and consecutive launching of hybrid vehicle, lead-acid batteries remain an only selection for the hybrid vehicle mainly due to that the already merchandised secondary battery has not yet offered advantages of cheaper price, matured technology, safe and reliable, and recyclable as found with the lead-acid battery. It is estimated that the status of the lead-acid battery remains unshakable in the coming decade. Furthermore, continuous outstanding improvements have been made to the lead-acid battery either in density of energy, density of power or life cycle thanks to inputs of new technologies and materials.

Having lead-acid battery as a standby energy source for mobile transportation carriers (e.g., long-distance trucks and yachts) to serve as source of power for internal equipments of the transportation carriers while they are not moving so to prevent oil consumption and air pollution caused by otherwise continuously running engines. At present, a framework of the lead-acid battery as a standby energy source operates on multiple batteries connected in parallel to increase capacity is and instantaneous output energy. Partial energy is induced to charge lead-acid battery while delivering power to internal equipments of the carrier through alternator and voltage regulator devices. Whereas transient surge created by changed instantaneous load and absence of management of charging/discharging result in over discharging or over charging, and the service life of lead-acid battery actually consumed usually fails to reach half of its nominal life cycle.

To maintain effective charging efficiency for the lead-acid battery plate within the framework of multiple batteries connected in parallel, conventional approaches require power supply that is sufficient for distribution to each battery and consequently output power of the alternator must be relatively upgraded. Whereas whether the battery is fully charged should be judged by terminal voltage at the battery, the conventional framework of batteries in parallel prevents judging the charging status of a battery or isolating any malfunctioning battery. The presence of any failed battery not only wastes charging energy but also generates heat that seriously affects service life of the battery. Therefore, developing a smart battery management system for providing optimal charging method, judging health status of each battery, balancing capacities among batteries, isolating failed battery, and providing information on use status of the battery is an important way to upgrade life cycle of the lead-acid battery.

SUMMARY OF THE INVENTION

The primary purpose of the present invention is to provide a smart lead-acid charging/discharging management system to upgrade charging efficiency, achieve consistent capacity of battery cell, isolate defective or failed battery cell and extend service life of battery cell.

Figure 1:
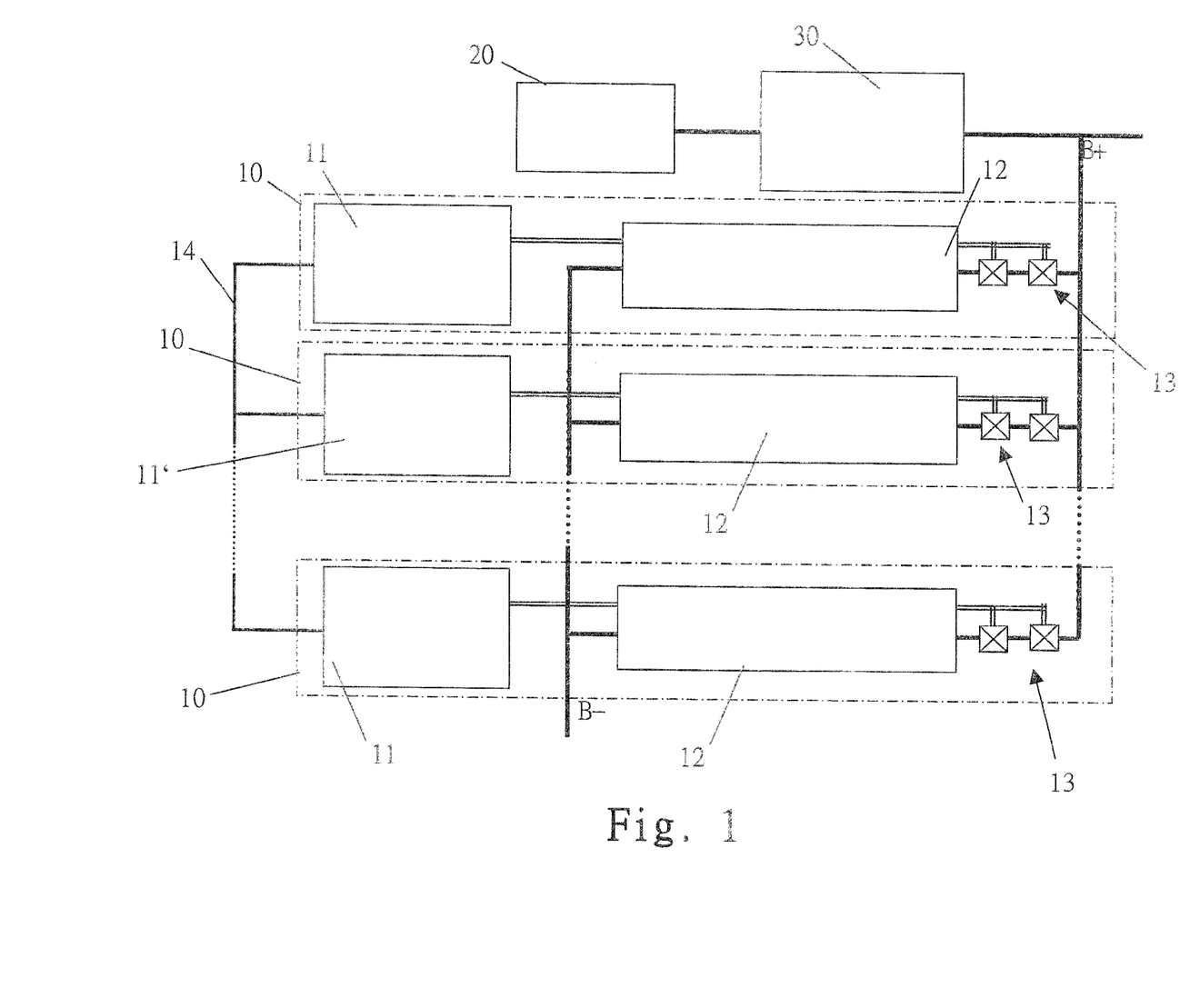
FIG. 1 is a view showing a framework of a smart lead-acid battery management system of the present invention.

To achieve the purpose, a smart lead-add battery charging/discharging management system of the present invention as illustrated in FIG. 1 of the accompanying drawings is comprised of one or plural smart battery units (10), an alternator (20), and a voltage regulator (30). Each smart battery unit (10) includes a cell controller (11), a lead-acid battery cell (12), a sensor switch device (13), and a transmission interface (14).

Through design of a smart identifier (117) using connector ID code wiring, a cell controller (11) of one smart battery unit (10) from the smart lead-acid battery charging/discharging management system is designated as the master controller (11') of the management system to be distinguished from other controllers (11) by a micro-control unit (111) disposed in the controller (11) according to signal level emitted from a smart identifier (117). The master controller (11') is a central control unit for the entire system to dominate the by turns charging sequence among those smart battery units (10) and to achieve balanced capacity among those smart battery units (10) by charging only one smart battery unit while neglecting other smart battery units that have been already charged to a given capacity. Determination of the charging status and health status of each battery cell is done by performing periodical inquiry of open circuit voltage, temperature, and charging voltage/amperage of each battery cell. When necessary, any unhealthy battery is isolated from the system. The transmission interface (14) takes the form of series master-slave framework to realize functions of control and data exchange with the least connection.

Figure 2:
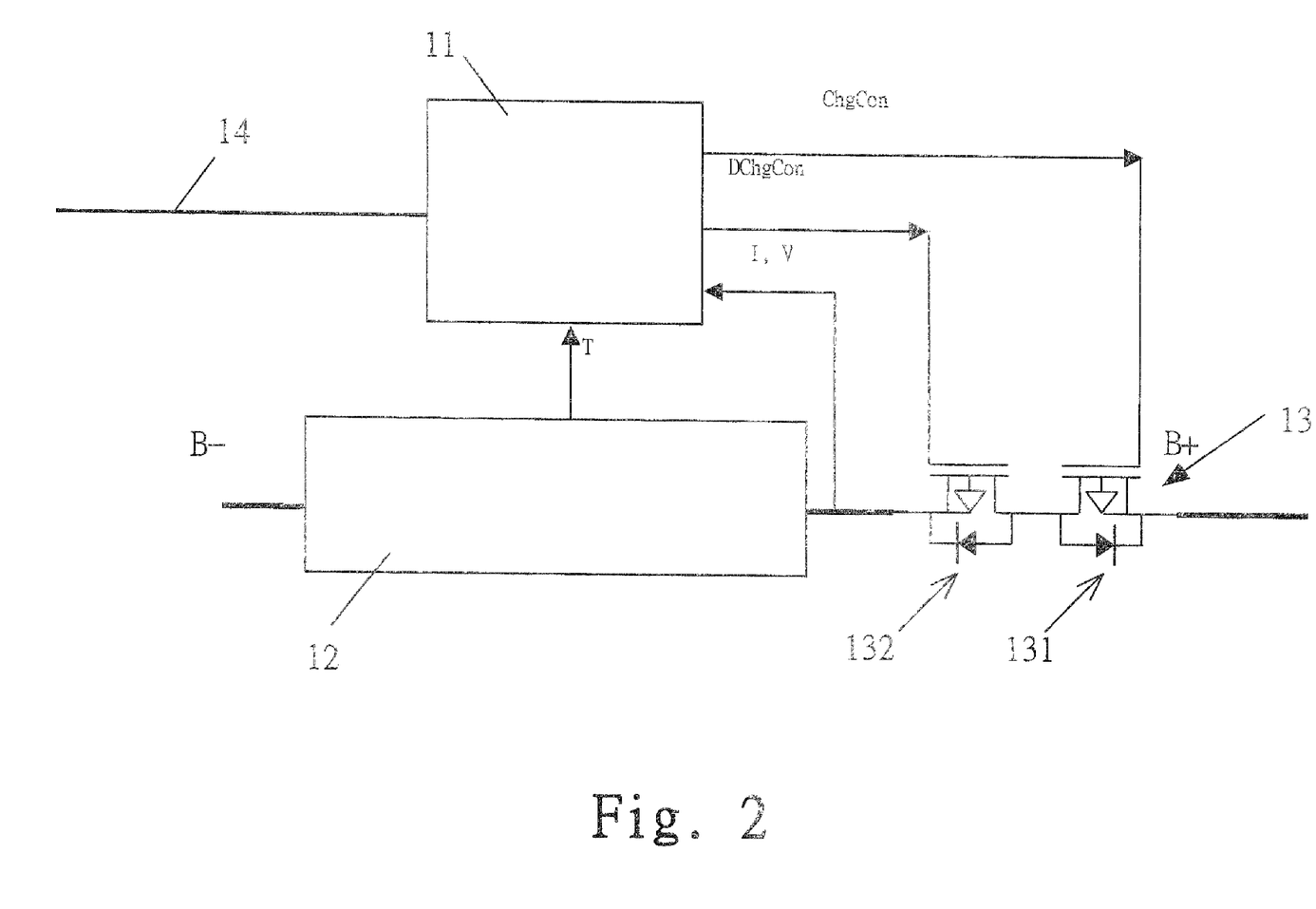
FIG. 2 is a view showing a configuration of sensor unit and control unit of a battery controller in the present invention.

The present invention is based on that each lead-acid battery cell (12), refer to as the battery cell hereafter, is provided with a set of sensor switch device (13) including a charging switch (131) and a discharging switch (132) as illustrated in FIG. 2. Under the monitor of the master controller (11'), charging all the battery cells (12) by turns is realized. Each controller (11) is subject to instruction given by the master controller (11') to control operation of the charging switch (131) and the discharging switch (132) of the sensor switch device (13), and to respectively report during the period of charging and suspended charging to the micro-control unit (111) of the master controller (11') the charging voltage/amperage and the open circuit voltage (VOC) measured by an analog-digital converter (ADC) built in the micro-control unit (111) for judging the charging status and health status of each lead-acid battery cell.

By selecting a proper charging configuration depending on output power of the alternator and characteristics of the battery cell used, the master controller (11') divides those battery cells (12) into groups with each group containing the same number of battery cells (12). Key parameters of the configuration include the total number of battery cells in the entire system, the number of battery cells in each group, the charging time per cycle, the upper limit of charging voltage, and the upper limit of open circuit voltage.

Command or data exchange between the master controller (11') and other controllers (11) is achieved through a drive/isolation interface (115). Data transmission is done by means of an optical coupling device (1151) to effectively isolate each independent battery control module to prevent failure of transmission system due to failure of any module. Completely identical HW and SW are provided to all controllers (11). Any controller (11) plugged to a connector of the master controller (11') when reactivated is capable of detecting and executing SW of the master controller (11') through the smart identifier (117) while the remaining controllers (11) at other sites execute general functions.

Figure 4:
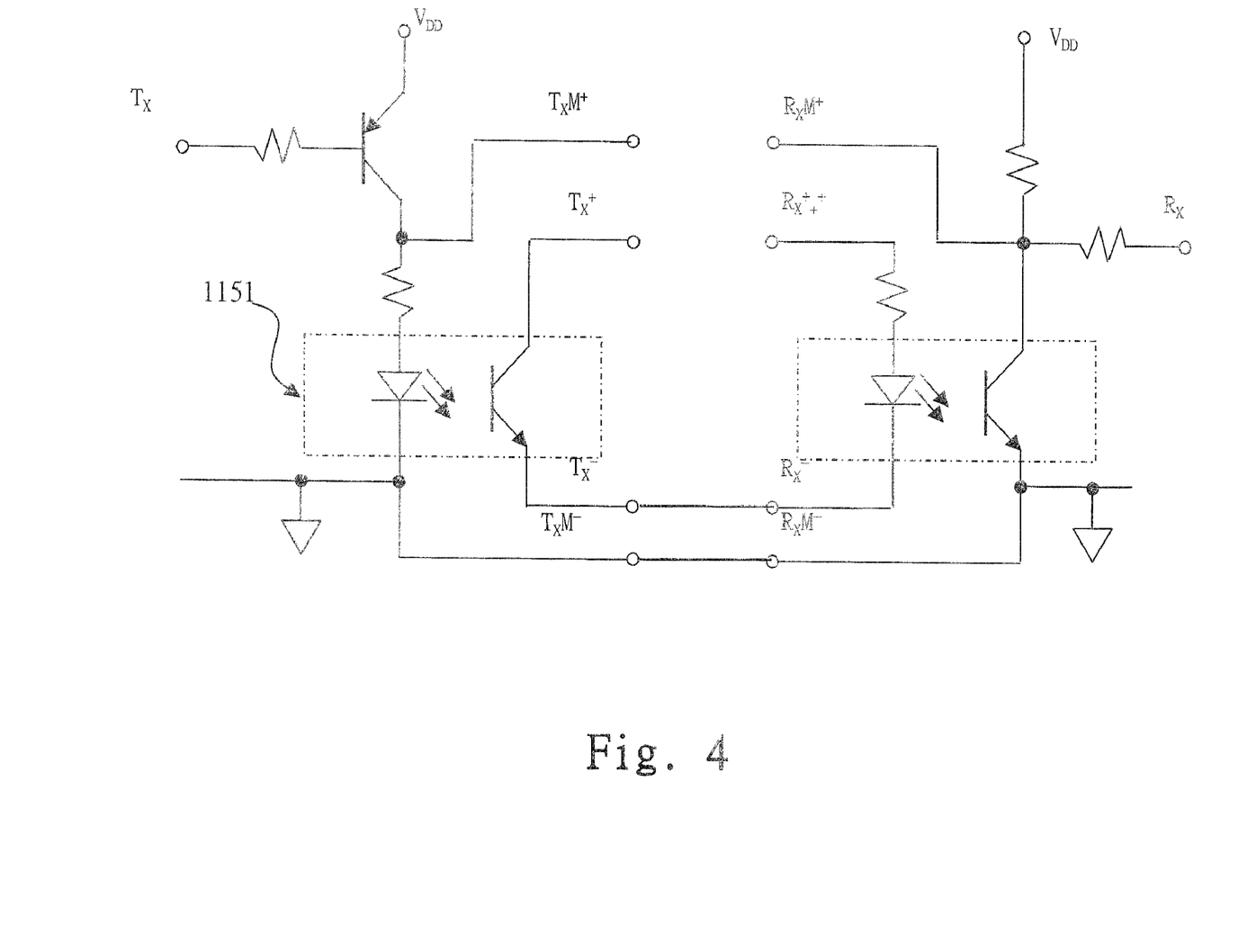
FIG. 4 is a detailed isolation drive/transmission circuitry within a master-slave framework of the present invention.

FIG. 4 shows a circuit of the master-slave transmission drive/isolation interface (115) of the present invention. There is a total of eight interface connection points, wherein $T_xM^-/R_xM^-$ and $T_x^-/R_x^-$ respectively relate to two sets of reference potentials.

Figure 5:
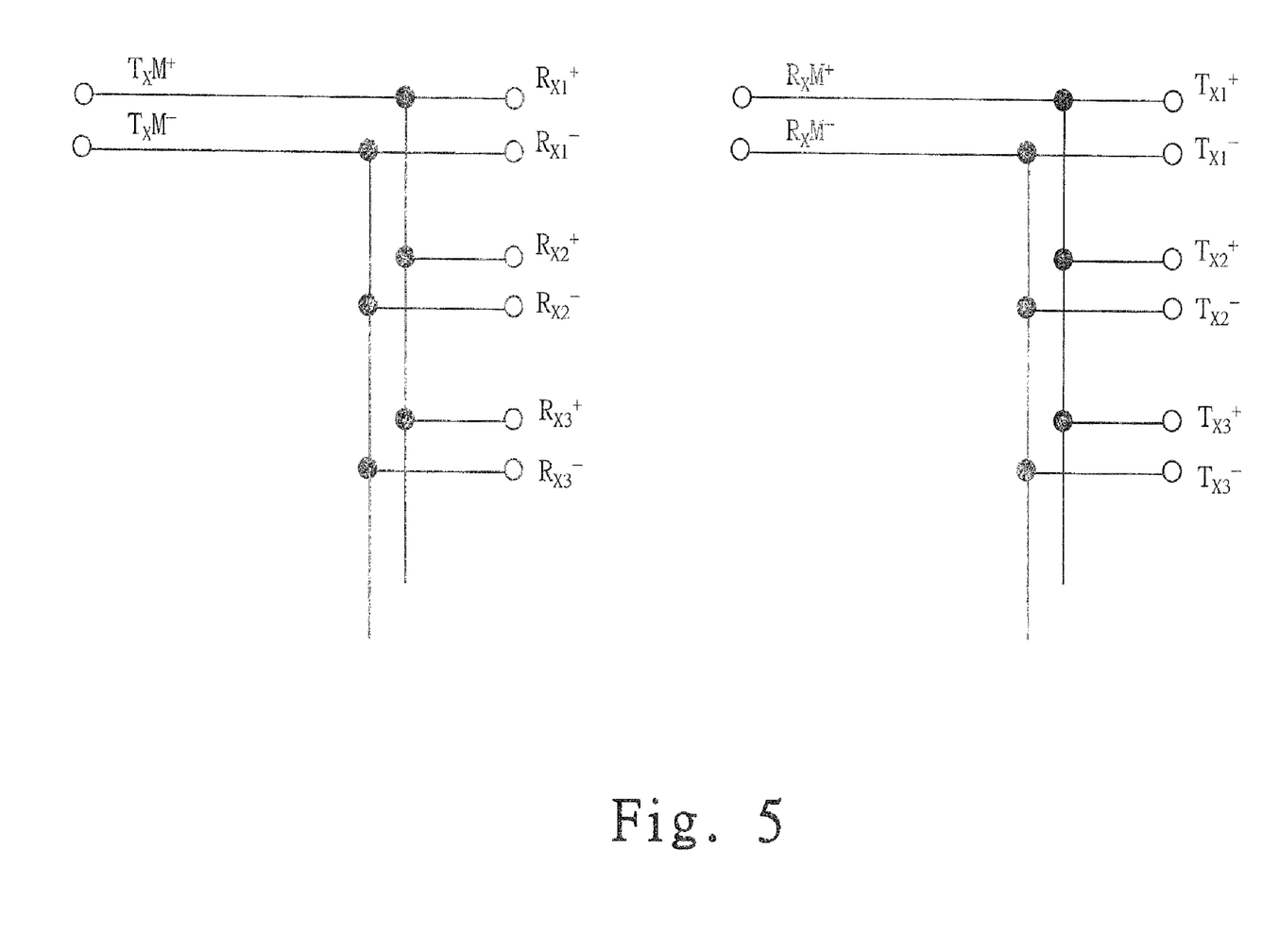
FIG. 5 is a wiring diagram of transmission among modules within the master-slave framework of the present invention.
Figure 6:
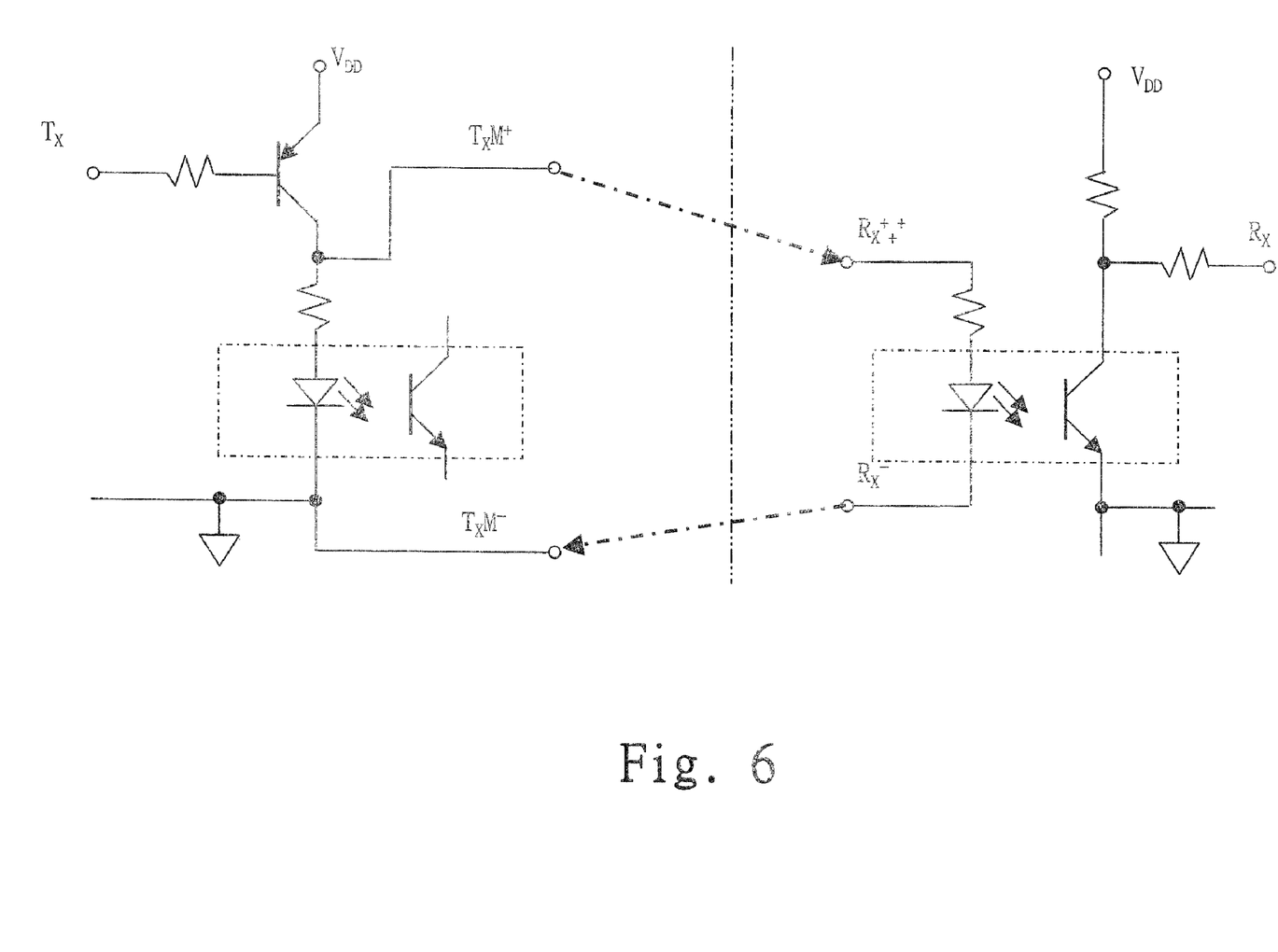
FIG. 6 is a schematic view showing transmission from a master controller and receiving by other battery controllers within the master-slave isolation drive/transmission circuit of the present invention.
Figure 7:
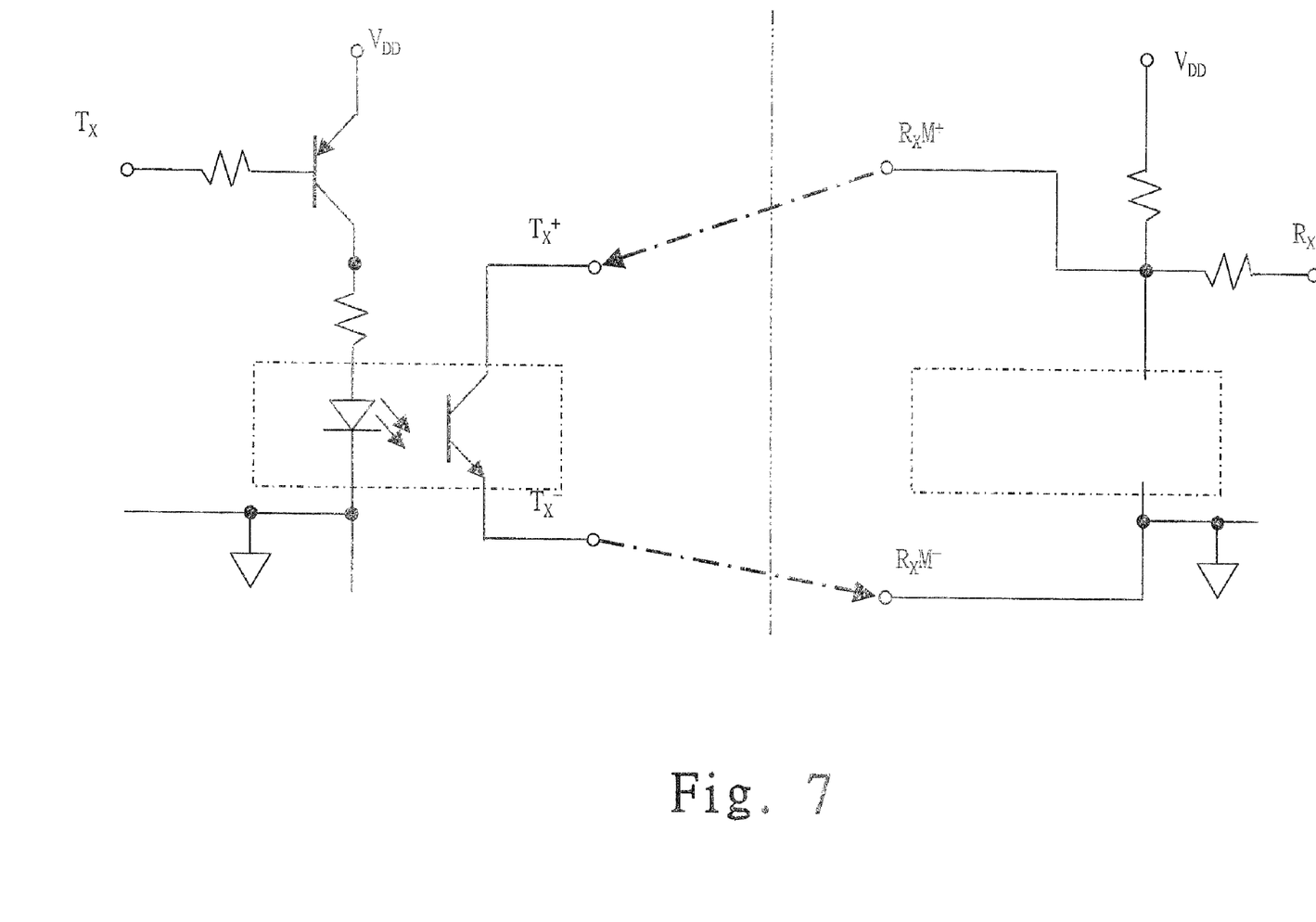
FIG. 7 is a schematic view showing transmission from other battery controllers and receiving by the master controller within the master-slave isolation drive/transmission circuit of the present invention.

FIG. 5 shows a wiring layout among those smart battery units (10). The controller (11) designated as the master controller (11') takes $T_xM^+/T_xM^-$ and $R_xM^+/R_xM^-$ as transmitting and receiving ports; and the remaining controllers (11) take $T_x^+/T_x^-$ and $R_x^+/R_x^-$. A reference level=$T_x^-$ for the individual module must be connected to $T_xM^-$ at the master controller (11') as the reference potential of the communication signal. Schematics in FIGS. 6 and 7 show the interface circuits of the present invention in the state of transmission and receiving, respectively.

Upon the connector of the smart battery unit (10)=plugged in, the controller (11) executes initialization procedure immediately. During the initialization procedure, battery parameters are read from memory followed by reading the battery ID code, a 4-byte battery serial number given ex-factory to each battery cell. The smart identifier (117) takes over to distinguish the master controller (11') from other controllers (11) to complete the initialization and enter automatic configuration setup procedure.

Figure 8:
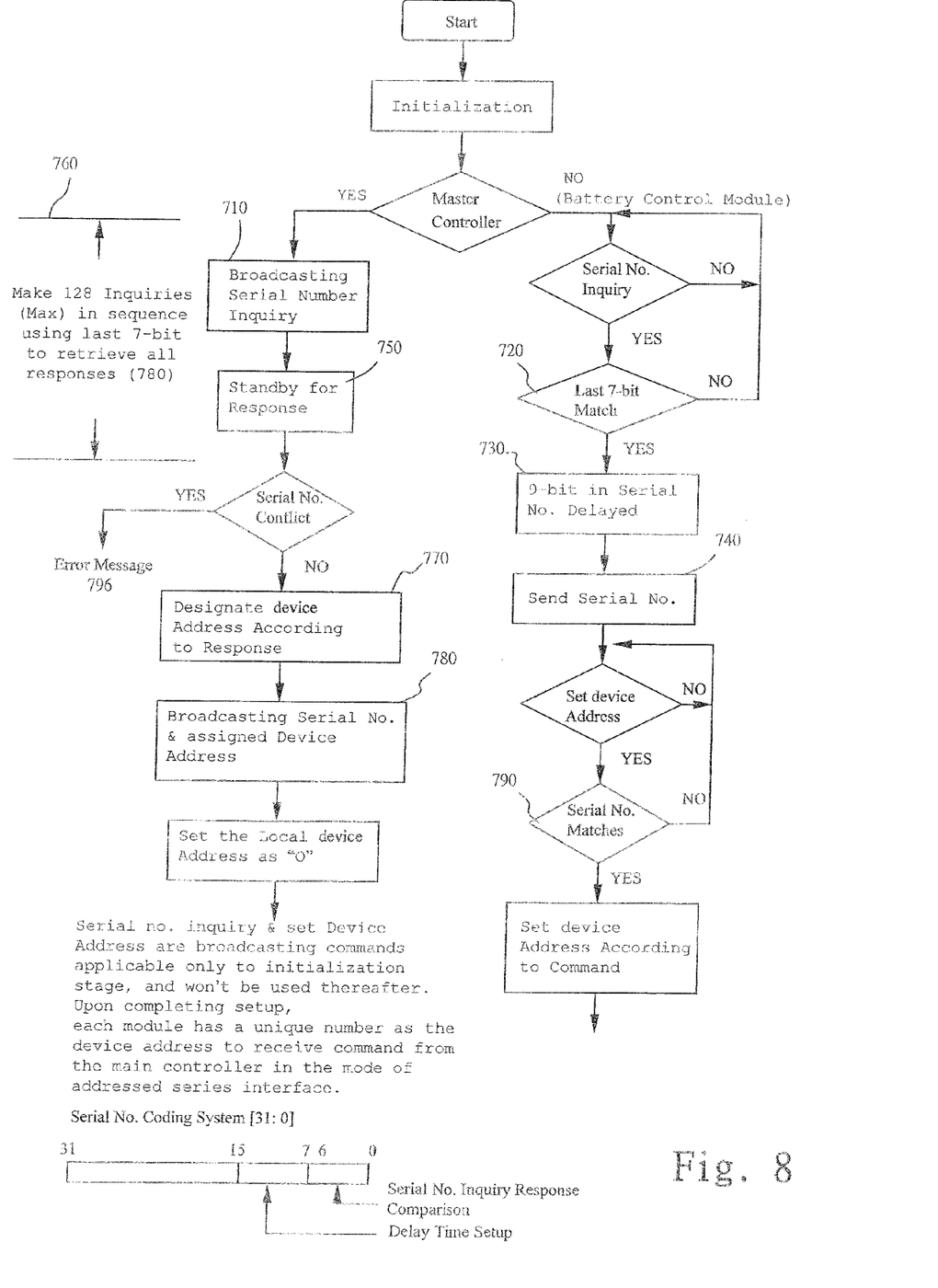
FIG. 8 is a flow chart showing a procedure of automatic configuration created in the present invention.

The master controller (11') activates the configuration setup as illustrated in FIG. 8. The least significant 16 bits of the 4-byte (32-bit) battery serial number is divided into the lower 7 bits as the inquiry comparison code and the upper 9 bits as the response delayed timing code. Taking the advantage of broadcasting feature of the master-slave configuration, the master controller (11') sends the serial number inquiry command. The parameter of the serial number inquiry command is the 7-bit comparison code. Upon receiving the serial number inquiry command, the controller (11) compares it with the lower 7 bits of the serial number of itself. If it does not match, the controller (11) will not make any response; and if the code matches, the controller (11) transmits its battery serial number (32-bit) to the master controller (11') after a delay of the response delay timing code 10 (9-bit) units of time. A unit time of delay is the period of time needed for transmission a set of battery serial number. As long as the response delay timing codes (9-bit) is different for battery control module having the identical comparison code (lower 7-bit), the battery serial number will be sent back at different time slots. Having identical lower 16-bit means 65,536 batteries manufactured and the probability of having batteries with same serial number in the same system is practically approaching zero. However, if conflict does happen, the total number of batteries in the entire system will become insufficient. In this case, an error message is sent during the stage of configuration setup. The master controller (11') retrieves all battery serial numbers in the system after 128 (maximal) inquiries to assign each controller (11) a corresponding module serial number, i.e., the address of the device. The device address of the master controller (11') is "0". Serial number inquiry comparison code and response delay timing code may be modified into any bit number depending on the size of the system and possible conflict assessed.

Figure 9:
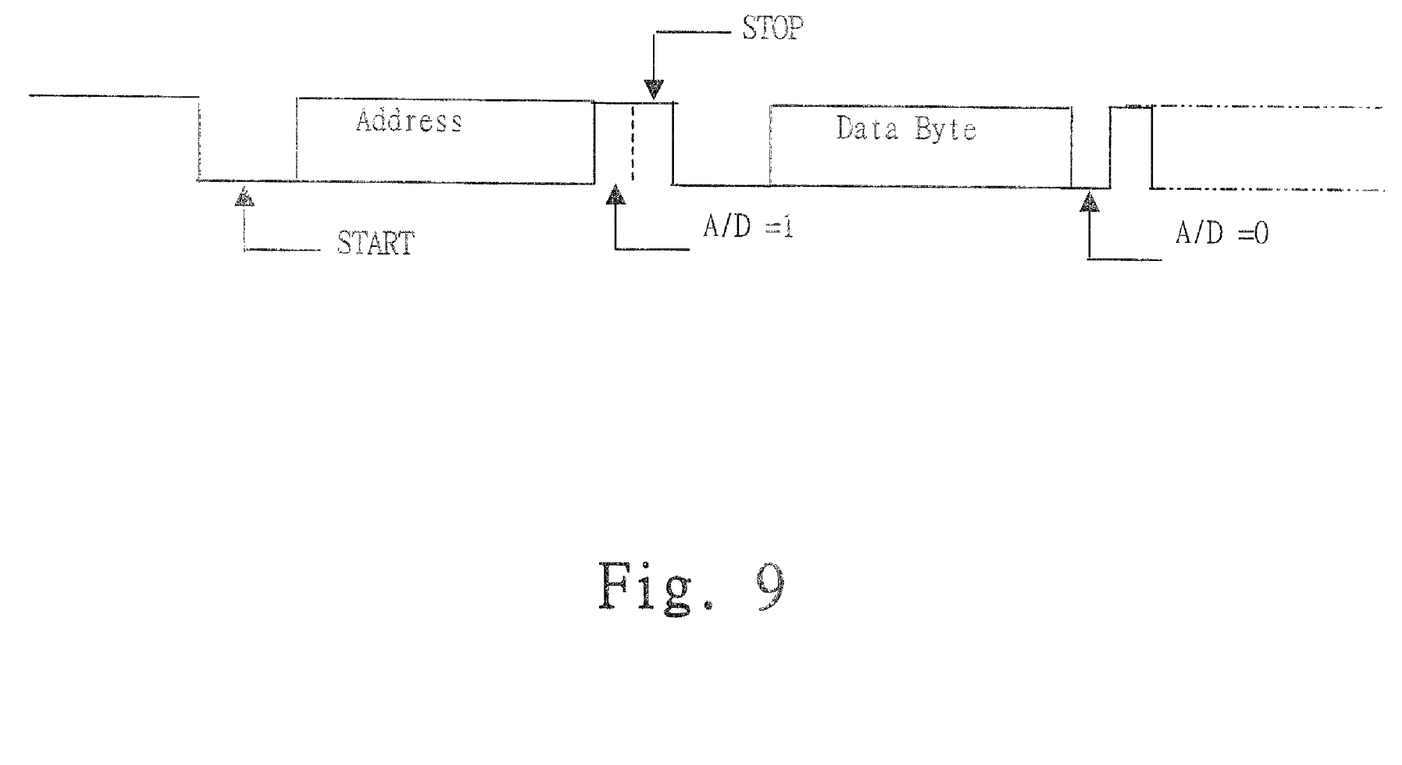
FIG. 9 is a view showing an addressed UART format in the present invention.

When the master controller (11') completes system configuration automatic detection and assignment of device address, each battery controller (11) is subject to control by the master controller (11') in Addressed UART. The Addressed UART is an extension of UART to start transmission with a code of START and stop transmission with a code of STOP as illustrated in FIG. 9. In addition to the data (8-bit), the $9^{th}$ bit originally used as a parity bit in the UART is changed to as an identifier of address or data (A/D). When A/D=1, it indicates that the 8-bit data is an address; and A/D=0 indicates data.

Figure 10:
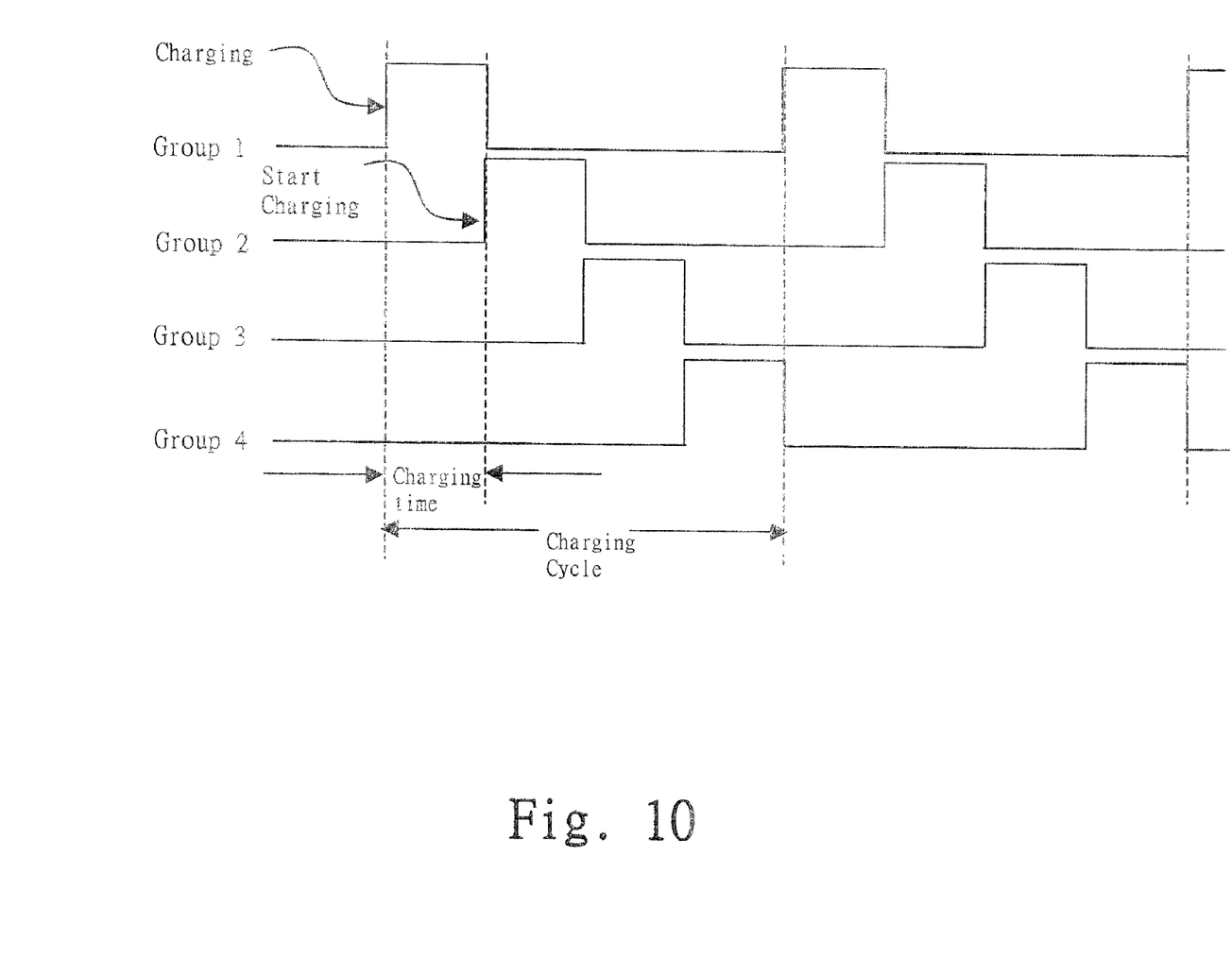
FIG. 10 is a view showing a charging sequence by turns among groups of batteries led by the master controller of the present invention.

The master controller (11') carries out pulse charging by giving each controller (11) a charging followed by a cease charging command. Depending on the preset framework, the master controller (11') gives charging commands in sequence while continuing to read the status of each controller (11) in decision making of whether a charging is warranted. FIG. 10 shows the charging sequence constructed by each controller (11) according to commands given by the master controller (11') within the framework of four groups of batteries are being charged in the present invention.

Whereas the output voltage from the voltage regulator (30) fluctuate dynamically, a constant voltage (CV) charging by changing output voltage as demanded cannot be carried out; and the charging current is affected by load of attached equipment to prevent from using the current taper in precisely judging whether the battery is fully charged or not. These contribute to the primary causes explaining why the conventional lead-acid battery has a poor cycle life when applied in conveyances.

A smart management system of the present invention carries out pulse charging by turns in sequence and measures the open circuit terminal voltage of the battery when the charging switch (131) is turned off to faithfully indicate capacity of the battery to judge if continuous charging is required.

DETAILED DESCRIPTION OF THE PREFERRED EMBODIMENTS

A smart lead-acid battery charging/discharging management system of the present invention relates to an electricity system comprised of multiple smart battery units (10) connected in parallel. Referring to FIG. 1, a system configuration of the present invention is essentially comprised of multiple controllers (11) to be identified from a smart identifier (117) 25 provided on a connector adapted to each controller (11). Wherein, the controller (11) of a smart battery unit (10) is designated as a master controller (11'). Control commands and data are transmitted to each controller (11) or responded to the master controller (11') through the transmission interface (14) by an addressed procedure of the master controller (11'). With a sensor switch device (13), the controller (11) detects voltage/amperage of the batteries in charging or detects voltage of the batteries in static status and detects temperature of the batteries for judging energy storage and health status. While being subject to commands given by the master controller (11') the controller (11) turns off a charging switch or a discharging switch. The individual battery cell (12) is related to a conventional valve-regulated lead-acid battery.

All batteries and their control circuits within the management system of the present invention are totally identical. The only master controller (11') is automatically created by means of the smart identifier (117) and a framework setup is completed through software detection to construct a master-slave configuration for the system. Interaction between the master controller (11') and each controller (11) and the monitor by the master controller (11'), the present invention allows safe and efficient charging and discharging, provides optimal maintenance for batteries by avoiding over charging or over discharging, and extends service life of the batteries. An alternator (20) and a voltage regulator (30) providing power source are also an integral part of the charging system.

Figure 3:
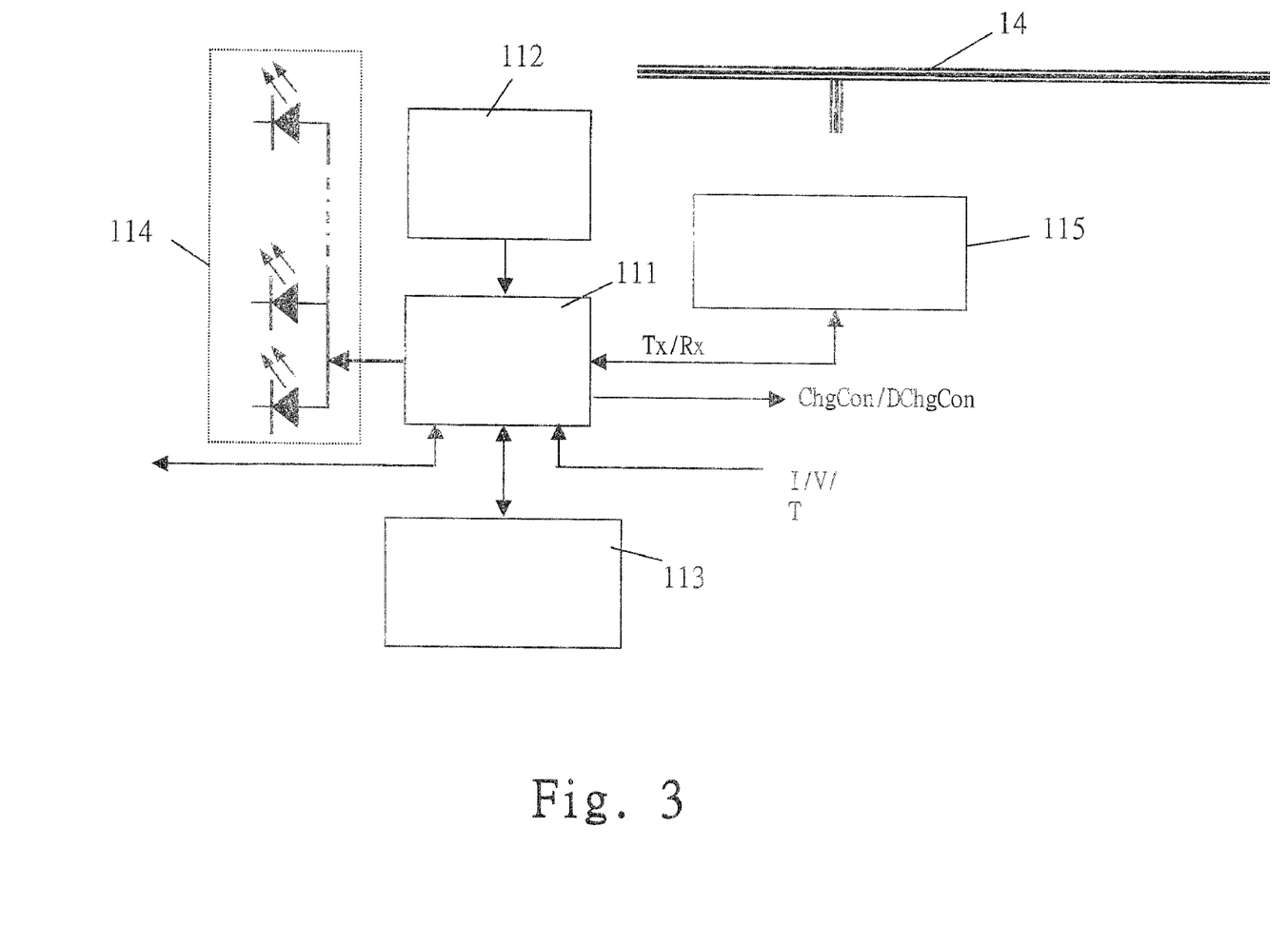
FIG. 3 is a functional block diagram of the battery controller in the present invention.

Each controller (11) is comprised of a micro-control unit (111), a time synchronous unit (112), a data access unit (113), a display unit (114), and a drive/isolation interface (115).

The micro-control unit (111) relates to a microprocessor with built-in flash memory, two series ports, one I²Cbus, multiple analog-digital conversion (ADC) ports and multiple digital input/output ports; the time synchronous unit (112) provides correct time message for data storage and ADC ports are provided for measuring battery voltage, amperage, and temperature; the data access unit (113) stores all messages associate with abnormal status for inquiry of battery status and failure judgment in servicing; the display unit (114) comprised of LEDs displays status of the battery module and the display status includes in charging, fully charged, in discharging, and failure; and the interface drive/isolation unit (115) is related to a master-slave isolation/drive transmission interface circuit. FIG. 4 shows a feasible circuit, wherein data transmission is executed between the master controller (11') and the control module by means of a current loop through an optical coupling device (1151) to effectively isolate noise generated by each control module and to physically isolate any failing control module so not to affect the communication of other modules. Whereas, isolation effect provided by the optical coupling device (1151) is capable of effectively solving the problem of potential difference of transmission signals of batteries connected in series, the circuit of the optical coupling device (1151) is also applicable to series combination.

Functions of the master controller (11') and other controllers (11) of the present invention are described as follows:

Functions of the Master Controller (11')

1. Initialization Procedure. Upon power is applied, the controller (11) designated as the master controller (11') is verified by the smart identifier (117), the master controller (11') reads out its built-in flash memory to confirm system configuration (including total number of battery units, number of battery in a charging group, upper limit of charging voltage, lower limit of discharging voltage, and upper limit of temperature);

2. Configuration Setup Procedure. A specific broadcasting command is given to carry on search for battery serial number so to retrieve serial numbers of all battery control modules. Device address of each smart battery unit is designated and to be used in subsequent addressed communication;

3. Charging Management. Each and all battery groups are charged in sequence by turns according to the system charging groups; and any battery unit when fully charged temporarily quits from the charging sequence while the remaining smart battery units are charged without interruption so to achieve balanced capacities among all smart battery units;

4. Status Inquiry. Depending on the number of the system batteries and battery configuration, the master controller (11') demands all control modules to report in sequence updated messages including charging voltage, charging amperage, static voltage, battery temperature, and battery status; and 5. Failure Judgment Process & Report. The status of each battery is judged depending on the messages available from status inquiry so to exclude the failing battery from the charging sequence by turns and shut off the discharging switch to stop discharging.

Functions of Other Controllers (11)

1. Initialization Procedure. Upon power is applied, the controller (11) is verified not having been designated as the master controller (11') by the smart identifier (117) and starts to read out its built-in flash memory to confirm system configuration (including upper limit of charging voltage, lower limit of discharging voltage, and upper limit of temperature);

2. Configuration Setup Procedure. Wait for the command of search for serial number from the master controller (11') and report the serial number after the delayed time, and wait for the command of designating battery device address and to have the designated device address for use in the subsequent addressed communication;

3. Charging/discharging Management. Control the charging switch to charge and suspend discharge as instructed by the master controller (11'), measure charging voltage and amperage in the course of charging, measure static voltage when charging is suspended, and periodically measure battery temperature for battery status to judge whether the battery is fully charged, overcharged or reaching the lower limit of discharging;

4. Status Report. Report charging voltage, charging amperage, static voltage, battery temperature, and battery status as instructed by the master controller (11'); and 5. Abnormality Handling. When any battery is judged as in abnormal status and the display unit (114) indicates a failure, synchronous time and then currently measured data, and status code are stored in the flash memory to be read out in maintenance so to facilitate cause analysis of failure.

It is to be noted that the master controller (11') also provides functions found with a general controller (11); therefore, the master controller (11') is capable of providing those functions described in Paragraphs 2, 3, and 4 under the header of Functions of Other Controllers (11).

Now referring to FIG. 4, the circuit of the master-slave drive/isolation interface (115) includes a total of eight signal I/Os for transmission and receiving. The master controller (11') uses transmission I/Os of $TxM^+$, $TxM^-$, $RxM^+$, and $RxM^-$ while any other controller (11) are connected in parallel using $Tx^+$, $Tx^-$, $Rx^+$, and $Rx^-$. Signal is grounded at the terminal of the master controller (11') while the terminals of the controllers (11) are floating. FIG. 5 shows wiring among controllers (11) of the present invention; and transmission and receiving circuits of the master controller (11') are illustrated in FIGS. 6 and 7, respectively. When the master controller (11') is transmitting data as illustrated in FIG. 6, signal runs through $TxM^+$ to reach $Rx^+$ and creates a current loop at where between $Rx^+$ and $Rx^-$ of the controller (11). When the input terminal at Tx is at low potential, it drives the optical coupling device (1151) so that the output terminal at Rx is at low potential. In transmitting data by any controller (11) and the input terminal at Tx of the controller (11) is at low potential, it drives the optical coupling device (1151) for $Tx^+$ and $Tx^-$ to create a route so that when current flows from $RxM^+$ to $Tx^+$ to create a current loop at where between $Tx^-$ and $RxM^-$ of the controller (11) for the output at Rx terminal of the master controller (11') to be at low potential.

When the transmission interface (14) is in static status without any transmission activity, Tx signal of each module is at high potential level; and there is no currents flowing on the interface circuit to consume power.

Each controller (11) is provided with a charging switch (131) and a discharging switch (132). As led by the master controller (11'), intermittent pulse charging is realized among battery cells by turns. During configuration setup, smart battery units (10) in the system are divided into multiple groups with each group containing the same quantity of battery unit according to the output status of alternator (20) and loading status of the equipment. Whenever a charging switch (131) of a smart battery unit (10) in any group is activated, all other groups are at open circuit status. Battery voltage and amperage of the smart battery unit (10) in the group under charging can be measured by means of an analog-digital converter. The battery open circuit voltage of each battery group in open circuit can be measured to estimate the battery charging status for evaluating the health status of the battery. In addition to the charging switch (131), the discharging switch (132) is also disposed to each smart battery unit (10) so that when any battery cell having its voltage under the preset lowest output voltage or the battery is judged as having been damaged to prevent further use, the discharging switch (132) cuts off the battery unit to avoid wasting energy or permanent damage to the battery cell due to inverse charging on the damaged battery.

The smart identifier (117) built in the system wiring connector is short connection to input signals in a wiring fashion; and the low potential is found only at an input of the master controller (11') while others are floating. When connected to the wiring connector of the system, the controller (11) immediately enters into initialization procedure to read out battery parameters and battery serial number from the memory and the smart identifier tells whether the master controller (11') or the controller (11) to be initialized. Upon completing the initialization, the battery control module immediately enters into an automatic configuration setup procedure.

As illustrated in FIG. 8, the master controller (11') activates the automatic configuration setup procedure. The length of battery serial number is of 32 bits, sixteen lower bits are further divided into a serial number inquiry comparison code comprised of the last seven bits and a response delay timing code comprised of nine bits. Using the master-slave UART broadcasting function, the master controller (11') sends a serial number inquiry command and a serial number inquiry comparison code to be simultaneously received by all controllers (11) (710). A parameter of the serial number inquiry code relates to a 7-bit comparison code. The controller (11) matches the serial number inquiry command and the comparison code comprised of last seven bits of the serial number of the controller (11) (720). If the code does not match, no response will be made. If the code matches, the battery serial number of the controller (11) is transmitted to the master controller (11') (740) after the delay of a unit time of the 9-bit response delay timing code (730). The period of each delay unit time is that needed for transmitting a battery serial number. All the battery control modules having identical last 7 bits transmit their battery serial numbers at different time as long as their 9-bit response delay timing codes are different. The latest time for transmitting response is of 511 delay units. The master controller (11') starts to receive responses upon sending serial number inquiry command (750), and proceeds to transmit next serial number inquiry comparison code after 512 units of delay time expiration. Upon completing the inquiry of all 128 serials number (a total of 128 numeric values out of 7 bits) or all the expected quantity of controllers have responded (760), the master controller starts to designate device address (770) while transmitting the match of the serial number and the device address by broadcasting (780) to the controller (11). Upon receiving the match command, the controller (11) compares the command with its serial number (790) to obtain the device address assigned to the controller (11) for use in addressed UART.

Each smart battery unit (10) is assigned a unique serial number, i.e., the series number of production. Having identical last 16 bits means a gap over 65,000 battery units in the production sequence, and the probability of battery units having same serial numbers to be used within the same system is practically approaching zero. However, if the conflict of serial numbers does happen, the smart battery unit (10) of conflict prevents from being identified thus to result in insufficient total number of the battery units in the entire system generated during the configuration setup procedure. In this case, the master controller (11') sends an error message to stop the configuration setup procedure (795). Under normal condition, the master controller (11') after having given 128 serial number inquiry commands (maximal) (with serial number inquiry comparison codes ranging from 0 through 127) will retrieve serial numbers of all batteries within the system.

Upon completing system configuration detection by the master controller (11'), each controller (11) is put under control by the master controller (11') in a mode of addressed UART. The addressed UART is an extension of UART in a transmission data format starting with a start code (START) and ending up with a stop code (STOP) as illustrated in FIG. 9. The context of the format is defined as 8-bit data while the $9^{th}$ bit serving as a parity code in the original UART is changed to serve as an address and data ID code. As a high-bit, the $9^{th}$ bit indicates the data is related to an addressed code; and low-bit, data.

The master controller (11') causes pulse charging by sending command to each controller (11) to charge or cease charge. Depending on a preset configuration, the master controller (11') gives charging command in sequence to all controllers (11) while continuing to read the status of each controller (11) for making decision on whether the charging will be executed. FIG. 10 shows a charging time sequence constructed for all the controllers (11) within a configuration of four groups of battery units to be charged and under condition that normal charging is acceptable to all groups, charging voltage and amperage are measured for Group 1 in the course of charging. Charging switches of Groups 2, 3, and 4 are all turned off to remain in static status and the open circuit voltage for battery units from each group is measured. When the preset charging time expires, charging battery units in Group 2 is initiated by activating their charging switches upon receiving the charging command given by the master controller; meanwhile, each controller (11) in Group 1 upon receiving the command to cease charging from the master controller (11') turns off its charging switch to cease charging. Upon completing a charging cycle in sequence for all four groups, a next cycle of charging commences from Group 1 once again.

While giving charging commands in sequence, the master controller (11') keeps requesting report of battery status from each controller (11). Upon receiving any message reporting abnormality of a battery unit by the master controller (11') or any battery cell has been fully charged with charging, charging for those groups in that battery module must be stopped.

Figure 11:
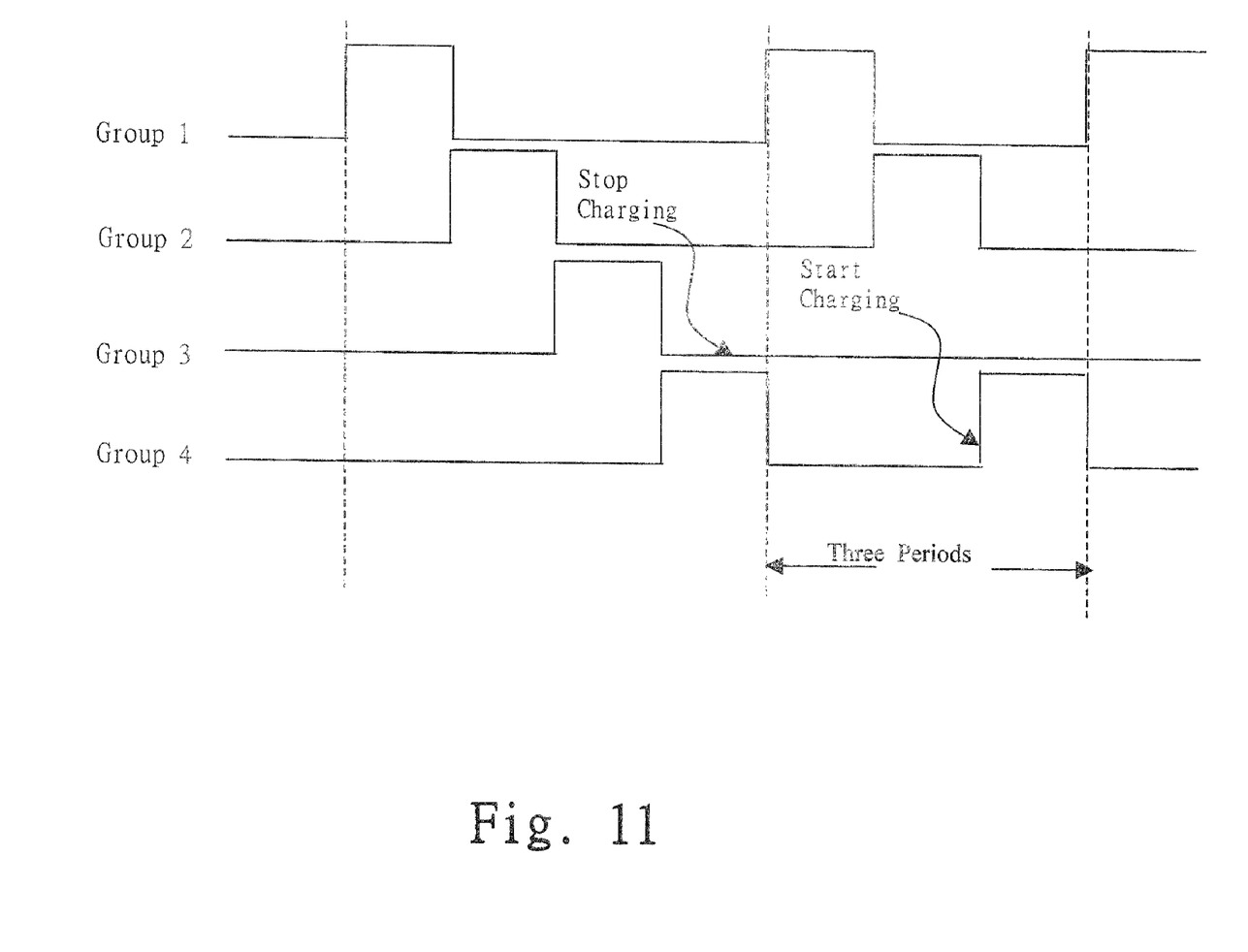
FIG. 11 is a view showing a charging sequence by turns among certain parts of the groups of batteries of the present invention.

FIG. 11 shows an example that when the charging for Group 3 should be stopped, the charging cycle planned by the master controller (11') will skip that Group by directly given the command to the next group to start charging. Accordingly, the charging cycle is reduced from four down to three periods, i.e., a charging efficiency is upgraded from one fourth to one third. Instead of bypassing a charging current to a load in a conventional solution, all charging current is effectively consumed in charging the battery unit in the present invention thus to prevent heat generated by the load bypassed from affecting cycle life of the battery unit.

The controller (11) of each smart battery unit (10) controls on/off operation of the charging switch as instructed by the master controller while continuing to read information of amperage, voltage, and temperature of the battery cell from the analog-digital converter in the absence of receiving any command from the master controller (11'). In the course of discharging, the controller (11) maintains to aggregate the total discharging capacity and convert it into cycle counts of the battery. The highest open circuit terminal voltage allowed for charging of the battery is solved according to the battery's cycle counts and temperature. The time length available for use from the battery is effectively extended as long as the open circuit terminal voltage for charging the battery cell does not exceed the highest open circuit terminal voltage allowed.

Figure 12:
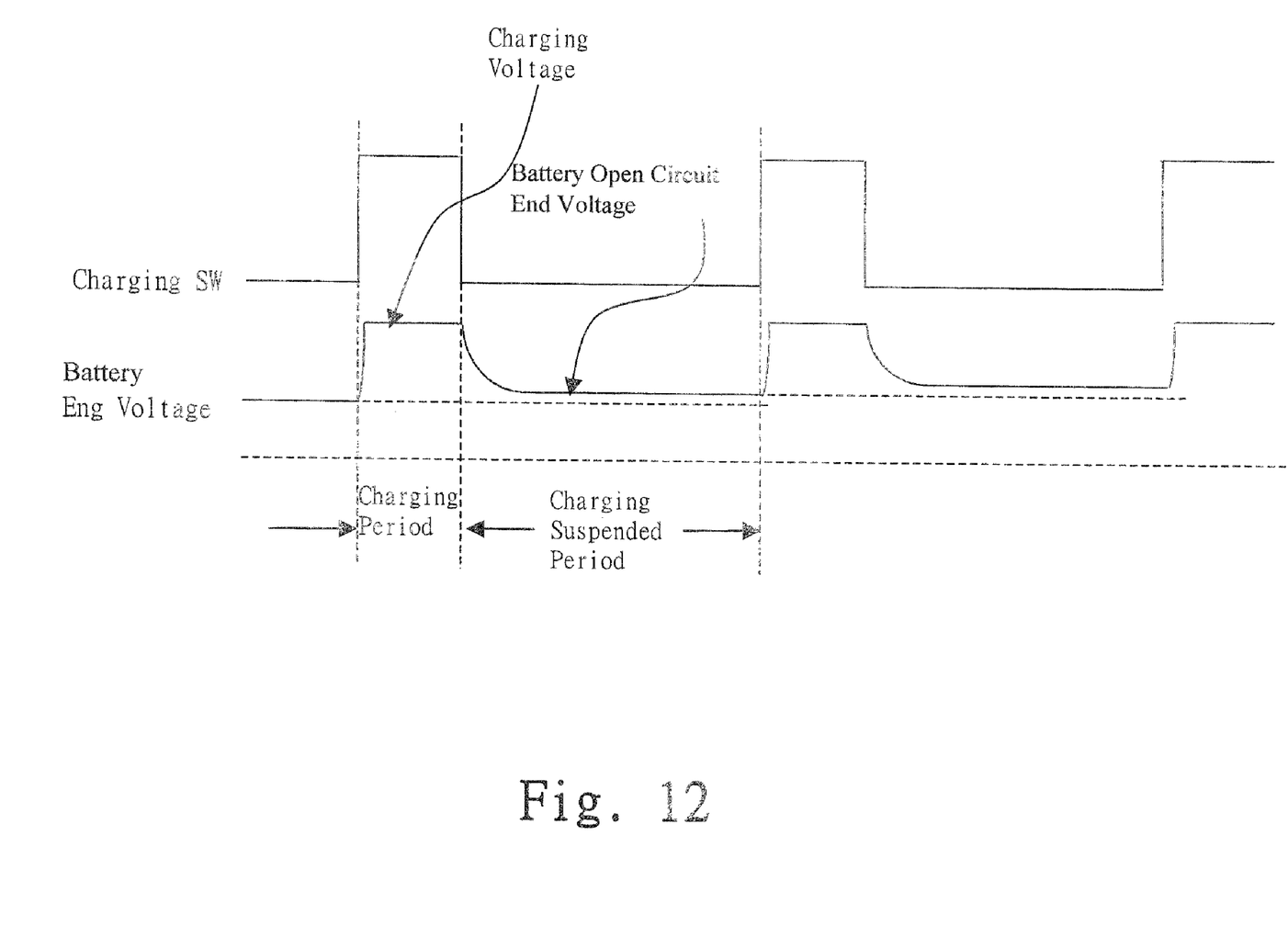
FIG. 12 is a schematic view showing charging voltage and open circuit terminal voltage of the present invention.

FIG. 12 shows a relation between on/off status of the charging switch and the terminal voltage of the battery cell in the course of charging. In the course of charging after the charging switch is activated, the charging voltage is measured. When the charging is ceased and there is absence of current, the voltage measured is related to the open circuit terminal voltage of the battery. Depending on whether the open circuit terminal voltage of the battery has reached its preset value, the master controller (11') judges whether the charging for a battery cell is completed and causes the controller (11) of that battery cell to respond when inquired by the master controller.

If amperage measured relates to a negative value, the discharging amperage is measured. Opposite to that the charging current will be partially converted into thermal energy to be dissipated in the course of charging, the discharging current relates to energy released from the battery cell reflecting the cycle life of the battery cell. The cycle counts related to the capacity accumulated by the battery since it is a vital factor in evaluating the service life of the battery. The master controller always monitor the discharging current, sum up the accumulated capacity, and convert the accumulated capacity into cycle counts of the battery. Both of the cycle counts and the current temperature of the battery cell determine an upper limit of the open circuit terminal voltage for charging the battery. Associate parameters are stored in the form of a table into a memory of the micro-control unit (111). A control software reads the upper limit value of charging from the table in making its judgment whether the charging to be interrupted. Accordingly, effective control over charging can be done without being affected by the environment so that the battery cell is able to cash its target cycle life as designed.

To summarize, the smart lead-acid charging/discharging management system of the present invention is capable of attaining the following purposes and results while meeting patentability elements of novelty and progressiveness of a patent:

1. The present invention discloses a smart lead-acid battery charging/discharging management system comprised of multiple identical smart battery units with each battery unit including battery controller, data transmission interface, charging control switch, discharging control switch, sensor device, and lead-acid battery cell to constitute a flexible master-slave smart battery management system. (Framework)

2. The present invention discloses an automatic detection of on-line devices and a method of setting up device address for a flexible master-slave smart battery management system without restricting the quantity of device. (Flexible framework)

3. The present invention discloses a management method of cyclic charging by turns to reduce charging power consumptions and measure open circuit voltage of the battery when the battery is not charged in the cyclic charging sequence, precisely control the actual charging efficiency of each battery cell in parallel and detect any battery with poor storage capacity. (Reduced working load of the alternator and detection of battery with poor storage capacity)

4. The present invention discloses a method to judge whether a battery is fully charged with the charging by reading the open circuit terminal voltage of the battery. The method involves solving an accumulated cycle counts of a battery according to a measured discharging amperage; and converting parameters of both the cycle counts and temperature of the battery cell into an upper limit of open circuit terminal voltage of the charging to serve as a basis in judging whether the battery is fully charged in the charging process. Parameters of battery characteristics needed in computation of conversion in the method are compiled according to the battery characteristics adopted and then stored in a flash memory of a micro-control unit. (Using open circuit terminal voltage to judge charging status, and the upper limit of voltage adjusted according to battery temperature and cycle counts)

5. The present invention discloses a method of having a master controller depending on the status of each group of batteries reported to cause cyclic charging by turns of battery groups to be charged. The method by allowing balanced storage capacities of batteries in the course of charging upgrades charging efficiency, effective application of all energy in charging to correct problems of waste of power and compromised service life of the battery due to heat as found with conventional way of bypassing charging energy to a load when the battery is fully charged. (Method to balance storage capacities among battery units, fully utilization of charging energy, higher charging efficiency, and reduced energy consumption)

6. The present invention is capable of isolating any malfunctioning or failing battery by having the master controller to give a command to turn off the charging switch and the discharging switch so to avoid unnecessary consumption of charging energy on a failing battery and to prevent battery from being damaged when overheated in the course of inverse charging. (Excluding poor battery cell, reduced energy consumption, and extended battery service life)

7. The present invention discloses a battery management method that allows maintaining normal operation through management of charging and discharging switches even when a limited number of batteries fail or degenerating. (Maintaining normal operation even with certain portion of batteries being excluded)

8. The present invention discloses a general master-slave series communication interface circuit and wiring layout that are applicable to both of the master and the slave devices. No power consumption takes place as long as there is the absence of data transmission on the interface circuit. (General master-slave series communication interface circuit, saving power)

9. The present invention discloses a design of transmission circuit to execute isolation using an optical coupling drive device and is applicable to where voltage difference problem exists between series and parallel master-slave devices. With the circuit and wiring layout disclosed by the present invention, any battery cell can be installed at any place within the system to function as a master or a slave device without relying upon any additional circuit. (Flexible configuration applicable to both series and parallel frameworks)

We claim:

1. A smart lead-acid battery charging/discharging management system comprising multiple identical smart battery units, an alternator, and a voltage regulator; each smart battery unit being comprised of a controller including a micro-control unit, a time synchronous unit, an access unit, a display unit, an independent communication device, and a smart identifier to execute smart battery unit management, data storage, system identification, master-slave communication, independent communication, estimation of battery life cycle, and judgment of battery charging voltage limits; a lead-acid battery serving as an energy storage device to control charging based on cycle counts and ambient temperature since overcharging or over-discharging will significantly affect energy storage capacity and cycle life; a sensor switch device including a charging switch and a discharging switch to detect voltage, amperage, and temperature data of the lead-acid battery and to further execute charging/discharging management of the battery; and a transmission interface for data transmission among smart battery units; wherein a controller from a smart battery unit within the system is designated as a master controller for the system to automatically constitute with other devices a master-slave system; the master controller causes all batteries to be charged in sequence by turns; and each battery in the course of charging maintains its electrode plate in active status under the lower demand of power to upgrade charging efficiency and extend service life of the lead-acid battery.

2. The smart lead-acid battery charging/discharging management system as claimed in claim 1, wherein the flexible master-slave smart battery management system is constructed of combination of series and parallel connected architecture frameworks to create a dynamic management framework.

3. The smart lead-acid battery charging/discharging management system as claimed in claim 1, wherein the controller using the management method of cyclic charging by turns reduces charging power demands, and measure open circuit voltage of the battery when the charging is suspended to accurately control real charging efficiency of each battery in series-parallel connection and detect any battery with poor energy storage capacity.

4. The smart lead-acid battery charging/discharging management system as claimed in claim 1, wherein the controller measures accumulated cycle counts of the battery using a method for judging with a discharging amperage whether the battery is fully charged with charging as judged by the open circuit voltage of the battery; and battery cycle counts and temperature are parameters to be converted into charging upper limit of open circuit terminal voltage to serve reference in judging whether a battery is fully charged.

5. The smart lead-acid battery charging/discharging management system as claimed in claim 1, wherein the smart identifier designates roles of master and slave using an external wiring setup; and each controller of the battery confirms its role as a master or a slave upon the system is powered on.

6. The smart lead-acid battery charging/discharging management system as claimed in claim 1, wherein the master controller after verification of a role of master or slave by the smart identifier activates an automatic configuration function to designate a unique device address for each and all smart battery units included in the system.

7. The smart lead-acid battery charging/discharging management system as claimed in claim 1, wherein the sensor switch device is put under management by the controller to maintain normal operation of the system in case that a limited quantity of batteries fails or is found deteriorating performance.

8. The smart lead-acid battery charging/discharging management system as claimed in claim 1, wherein the transmission interface relates to a general master-slave series communication interface circuit and its wiring layout that is applicable to both of the master and slave devices.

9. The smart lead-acid battery charging/discharging management system as claimed in claim 1, wherein the time synchronous unit relates to a standard timer to access to synchronous clock when connected to the system for serving reference in data logging of the controller; and the clock maintains its timing function at a minimum consumption of power stored in the battery without failure due to lower power level of the system.

10. The smart lead-acid battery charging/discharging management system as claimed in claim 1, wherein the sensor switch device retrieves information of charging, discharging, and temperature of the battery through computation and conversion executed by the controller using natural laws including Ohm's Law and Ampere's Right Hand Law.

11. The smart lead-acid battery charging/discharging management system as claimed in claim 2, wherein a dynamic management framework confirms master and slave relation within the system by means of automatic detection on-line device and an device address setup method.

12. The smart lead-acid battery charging/discharging management system as claimed in claim 4, wherein the controller converts and solves parameters of battery characteristics needed, compiles those parameters according to battery characteristics adopted, and stores those parameters in the data access unit.

13. The smart lead-acid battery charging/discharging management system as claimed in claim 4, wherein each controller periodically stores associate information and logging time of the battery in the data access unit for follow up and analysis of battery service and failure.

14. The smart lead-acid battery charging/discharging management system as claimed in claim 4, wherein resume of each battery is downloaded to an externally connected computer from the data access unit at any time through an independent communication device or under the framework of a battery.

15. The smart lead-acid battery charging/discharging management system as claimed in claim 6, wherein the controller designated as the master controller instructs each smart battery to report status of the battery so to evaluate and give command to charge the battery groups by turns.

16. The smart lead-acid battery charging/discharging management system as claimed in claim 6, wherein the smart battery unit reports information on the status of each battery to a controller designated as the master controller; the master controller gives commands to charge those smart battery units not yet fully charged with charging by turns so to achieve balanced battery capacity in the course of charging, upgrade charging efficiency, and effectively apply all energy in charging to solve the problem of waste of charging energy and compromised cycle life of battery due to heat generated from power consumption as found in a conventional process of having bypassed fully charged battery to a load.

17. The smart lead-acid battery charging/discharging management system as claimed in claim 6, wherein the battery controller when designated as the master controller gives a command to turn off the charging and discharging switches of any other controller so to isolate malfunctioning or failing battery to avoid unnecessary power consumption by the malfunctioning or failing battery and to prevent battery service life from being compromised by overheating generated in inverse charging.

18. The smart lead-acid battery charging/discharging management system as claimed in claim 8, wherein no power consumption takes place on the data transmission interface when the system is not executing data transmission.

19. The smart lead-acid battery charging/discharging management system as claimed in claim 8, wherein the data transmission interface is isolated by the optical coupling drive device, and is applicable to a transmission circuit design where a problem of voltage difference exists between the master and the slave devices connected in series and parallel, and with the circuit and wiring layout design of the present invention any battery can be installed at any location within the system to serve as a master or a slave device without relying upon any additional circuit setup.

20. The smart lead-acid battery charging/discharging management system as claimed in claim 8, wherein the data transmission interface is provided with large current drive function for supplying sufficient connected communication drive capacity within a system framework containing a large quantity of batteries.

* * * * *